UNITED STATES PATENT OFFICE.

WALTER KROPP, OF ELBERFELD, GERMANY, ASSIGNOR TO SYNTHETIC PATENTS CO., INC., OF NEW YORK, N. Y., A CORPORATION OF NEW YORK.

PHARMACEUTICAL PRODUCT.

1,252,452.      Specification of Letters Patent.      Patented Jan. 8, 1918.

No Drawing. Application filed July 21, 1915, Serial No. 41,152. Renewed November 23, 1917. Serial No. 203,624.

*To all whom it may concern:*

Be it known that I, WALTER KROPP, doctor of philosophy, chemist, citizen of the German Empire, residing at Elberfeld, Germany, have invented new and useful Improvements in Pharmaceutical Products, of which the following is a specification.

My invention relates to the manufacture and production of new and therapeutically valuable products being chemically carbonyl derivatives of phenols containing in the nucleus a substituent which has more than one carbon atom. My new products have the following general formula:

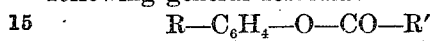

R stands for a substituent having more than one carbon atom and containing for example an aromatic nucleus; R' stands for

or

X and X' representing hydrogen or an alkyl, e. g. —CH$_3$, —C$_2$H$_5$, etc.

For producing my new products the free phenols or their derivatives or salts are converted into the carbamates or carbonates according to the usual methods. They are after being dried and pulverized whitish tasteless and odorless products generally soluble with difficulty in water. They are valuable anthelmintic remedies which do not irritate the mucous membrane. An average single dose is from 1–2 grams.

In order to illustrate the new process more fully the following example is given, the parts being by weight:—85 parts of para-benzylphenol are dissolved in benzene together with 60 parts of dimethylanilin. The resulting solution is then added to 300 parts of a 25 per cent. phosgen solution in benzene. After 12 hours the benzene solution is shaken with cold hydrochloric acid and is allowed to run while being stirred into a cooled aqueous ammonia solution. The para-benzylphenylcarbamate having most probably the formula:

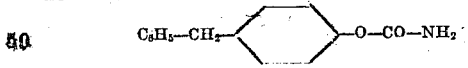

separates from the benzene solution, it is filtered off and crystallized from alcohol. It melts at 144° C. and is soluble in ether.

The carbonate of para-butylphenol melts at 108°; the para-isoamylphenylcarbamate melts at 73–74° C.; the carbamate of para-butylphenol at 123–124° C.; the carbamate of para-isopropylphenol at 93–95° C.; the para-butylphenyl-N-dimethyl-carbamate at 92° C.; the ortho-allylphenylcarbamate at 122–123° C.

For the purpose of this patent it is to be assumed that any products which may be obtained by treating the above mentioned phenols according to methods suitable and in use for the manufacture of carbonates and carbamates is within the class designated in this patent as carbamates and carbonates of phenols containing in the nucleus a substituent with more than one carbon atom, such being in accordance with the present understanding as a chemist and such being the intended generic scope of this patent.

I claim:—

1. As new products carbonyl derivatives of phenols containing in the nucleus a substituent which has more than one carbon atom and having the following general formula:

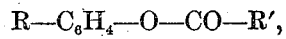

R standing for a substituent containing more than one carbon atom; R' standing for

or

X and X' representing hydrogen or an alkyl, which products are after being dried and pulverized whitish practically tasteless and odorless powders generally soluble with difficulty in water; and being valuable anthelmintic remedies, substantially as described.

2. As new products carbonyl derivatives of phenols containing in the nucleus a substituent which has more than one carbon atom and having the following general formula:

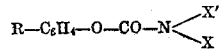

R standing for a substituent having more than one carbon atom, X and X' representing hydrogen or alkyl, which products are after being dried and pulverized whitish practically tasteless and odorless powders.

generally soluble with difficulty in water; and being valuable anthelmintic remedies, substantially as described.

3. As new products carbonyl derivatives of phenols containing in the nucleus a substituent which has more than one carbon atom and having the following general formula:

$$R—C_6H_4—O—CO—R',$$

R standing for a substituent containing at least three carbon atoms; R' standing for $$—OC_6H_4—R$$

or

X and X' representing hydrogen or an alkyl, which products are after being dried and pulverized whitish practically tasteless and odorless powders generally soluble with difficulty in water; and being valuable anthelmintic remedies, substantially as described.

4. As new products carbonyl derivatives of phenols containing in the nucleus a substituent which has more than one carbon atom and having the following general formula:

$$R—C_6H_4—O—CO—R',$$

R standing for a substituent containing an aromatic nucleus; R' standing for $$—OC_6H_4—R$$

or

X and X' representing hydrogen or an alkyl, which products are after being dried and pulverized whitish practically tasteless and odorless powders generally soluble with difficulty in water; and being valuable anthelmintic remedies, substantially as described.

5. As new products carbonyl derivatives of phenols containing in the nucleus a substituent which has more than one carbon atom and having the following general formula:

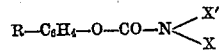

R standing for a substituent containing an aromatic nucleus, X and X' representing hydrogen or alkyl, which products are after being dried and pulverized whitish practically tasteless and odorless powders generally soluble with difficulty in water; and being valuable anthelmintic remedies, substantially as described.

6. As a new product the para-benzyl-phenyl carbamate having most probably the formula:

crystallizing from alcohol in crystals melting at 144° C.; being soluble in ether; and being a valuable anthelmintic remedy, substantially as described.

In testimony whereof I have hereunto set my hand in the presence of two subscribing witnesses.

WALTER KROPP. [L. S.]

Witnesses:
 HELEN NUFER,
 ALBERT NUFER.